United States Patent Office 3,530,216
Patented Sept. 22, 1970

3,530,216
VITAMIN COMPOSITIONS COMPRISING RIBO-FLAVIN-5-PHOSPHATE AND FERRIC PYROPHOSPHATE SOLUBLE
Arnold Cavalli, Cedar Grove, and Louis Magid, Cilfton, N.J., assignors to Hoffmann-La Roche Inc., Nutley, N.J., a corporation of New Jersey
No Drawing. Filed Oct. 5, 1967, Ser. No. 673,025
Int. Cl. A61k 15/12
U.S. Cl. 424—128                         4 Claims

ABSTRACT OF THE DISCLOSURE

Sodium riboflavin 5-phosphate and ferric pyrophosphate soluble, mixed in aqueous medium at about pH 4.4, form a stable, clear solution.

BACKGROUND OF THE INVENTION

Vitamin preparations, particularly those containing iron for treating or preventing vitamin deficiency and/or iron deficiency are conventionally administered orally, e.g., tablets dragees, liquid, i.e., elixirs, syrups and the like. The preparation of liquid formulations containing B-complex vitamins and iron has heretofore been beset by stability problems, i.e., the solutions containing both the B-complexes and iron in the form of a soluble salt become turbid. This is particularly true when the formulation contains riboflavin (vitamin $B_2$). Riboflavin is very slightly soluble in water, therefore, when it is desired to incorporate levels of riboflavin in excess of its solubility into aqueous formulations a soluble sodium salt is utilized, i.e., sodium riboflavin 5-phosphate. Soluble iron salts usually utilized in liquid iron preparations for oral administration, e.g., ferrous sulphate, ferrous chloride, ferrous gluconate, and the like, are incompatible with sodium riboflavin 5-phosphate in solutions since they are not commercially elegant preparations and a portion of the riboflavin is removed from solution, usually within several days, e.g., about four days. Thus, these solutions have to be used very shortly after preparation since they cannot be held in storage, transported for long distances, or stand on the shelf for any appreciable period of time.

SUMMARY OF THE INVENTION

This invention relates to a method of forming stable aqueous solutions of B-complex vitamins containing iron in soluble form and the product produced thereby. More particularly, this invention relates to a method of forming stable aqueous vitamin solutions containing sodium riboflavin 5-phosphate and ferric pyrophosphate soluble by controlling the pH of the solution. This invention also relates to vitamin-iron compositions comprising clear, stable aqueous solutions containing sodium riboflavin 5-phosphate and ferric pyrophosphate soluble.

DETAILED DESCRIPTION OF THE INVENTION

It has been discovered that stable aqueous vitamin formulations containing both vitamin $B_2$ and iron can be formed without the formation of a precipitate. This is accomplished by mixing together sodium riboflavin 5-phosphate and ferric pyrophosphate soluble as an aqueous solution and adjusting the pH of the solution to from about 4.2 to 4.6, preferably pH 4.4.

The vitamin and the iron salt can either be mixed together as dry powders, then dissolved, or solutions of the ingredients can be mixed together, or a solution of one can be mixed with a dry powder of the other. Any of these methods of formulating the ingredients are satisfactory for producing stable clear aqueous compositions by the process of this invention. The amounts of the vitamin and iron salt present is limited only by their mutual compatibility in aqueous solutions. Generally, in order to achieve accepted effective levels of both the iron and vitamin ingredients in the solutions, sufficient ferric pyrophosphate soluble is added to provide about the equivalent to 100 m. of iron per 30 cc. of aqueous solution. This can be advantageously accomplished by utilizing about 800–900 mg. of ferric pyrophosphate soluble per 30 cc. of solution. In order to provide an accepted effective level of vitamin $B_2$ in the solution, it is advantageous to add sufficient sodium ribaflavin 5-phosphate to provide 7 mg. of vitamin $B_2$ per 100 mg. of iron in a 30 cc. solution. This is preferably accomplished by utilizing a 1% solution of the soluble vitamin complex.

However, the invention is not limited to these specific concentrations since they may be varied to provide the amount of vitamin $B_2$ and/or iron necessary to achieve desired results in a specific patient.

After the formation of the aqueous solution containing the vitamin and iron, the pH is adjusted to about pH 4.2 to 4.6, preferably 4.4.

The pH adjustment can be accomplished by any pharmaceutically acceptable organic or inorganic base or acid. Generally, it is advantageous to use citric acid.

It is necessary to adjust the pH of the solution to within the specified range because if the pH is lower, e.g., 3 to 4, the stability of certain of the B vitamins present is adversely affected. If the pH is 3 to 4, the stability of panthenol and pantothenate is adversely affected to a greater degree than if the pH is about 4.2 to 4.6. If the pH is too high, e.g., over 4.6, greater decomposition of vitamin $B_1$ results.

The liquid formulations can contain in addition to riboflavin, other vitamins in combination in order to form a multivitamin preparation, e.g., vitamin $B_1$, vitamin $B_{12}$, if a complex B vitamin is desired. Also other conventional additives, e.g., flavors, colors, sugars and the like may be incorporated into the solutions so long as they are compatible therewith.

By "ferric pyrophosphate soluble" is meant a complex salt of sodium ferricitropyrophosphate which contains about 12% Fe, 20% $P_2O_5$ and 40% citric acid.

The following examples illustrate the process of this invention which is not intended to be limited thereto.

EXAMPLE 1

2.5 grams of ferric pyrophosphate soluble and 2.1 cc. of a 1% aqueous solution of sodium riboflavin 5-phosphate were mixed together and sufficient water was added to bring the volume to 90 cc. The resulting solution was clear. The pH of the solution was then adjusted to pH 4.4 with citric acid and allowed to stand at room temperature, about 25° C., for four days, then examined for stability. The resulting solution was only slightly hazy. The solution was then filtered through a Whatman No. 2 paper and allowed to stand at room temperature in clear, flint glass bottles. The resulting solution remained clear and stable, even after one year, with no precipitate.

EXAMPLE 2

A vitamin B–complex elixir was prepared utilizing the following formulation.

| Ingredient: | Amount per fl. oz. (29.57 cc.) |
|---|---|
| Thiamine HCl | mg__ 6.5 |
| Riboflavin phosphate | mg__ 7.54 |
| Niacinamide | mg__ 110.0 |
| Pyridoxine HCl | mg__ 1.1 |
| Panthenol | mg__ 5.0 |
| Vitamins $B_{12}$ (1–1000 in mannitol) | mg__ 4.4 |
| Methionine | mg__ 100 |
| Choline bitartrate | mg__ 100 |

| Ingredient: | Amount per fl. oz. (29.57 cc.) |
|---|---|
| Ferric pyrophosphate soluble | mg 833 |
| Ethanol | cc 3.92 |
| Sugar | grams 20 |
| Flavor | qs |
| Distilled H₂O qs. to 1 fl. oz. | |

Dissolve the thiamine HCl, riboflavin phosphate, niacinamide, pyridoxine HCl, panthenol, vitamin $B_{12}$, methionine, choline bitartrate and ferric pyrophosphate soluble in 11 cc. of distilled water. Add sugar and dissolve, then add ethanol, flavor and enough distilled water to bring the volume to 1 fluid ounce. The resulting solution was clear and stable.

We claim:

1. A stable, clear, aqueous solution having vitamin $B_2$ and iron therein, and a pH of from about 4.2 to about 4.6 comprising sufficient sodium riboflavin 5-phosphate to provide about 7 mg. of vitamin $B_2$ per 100 mg. of iron in a 30 cc. solution and sufficient ferric pyrophosphate soluble to provide the equivalent to about 100 mg. of iron per 30 cc. of solution.

2. A stable, clear, aqueous multi-vitamin solution comprising water-soluble B vitamins therein, a pH of from about 4.2 to about 4.6 and containing sufficient sodium riboflavin 5-phosphate to provide about 7 mg. of vitamin $B_2$ per 100 mg. of iron in a 30 cc. solution and sufficient ferric pyrophosphate soluble to provide the equivalent to about 100 mg. of iron per 30 cc. solution.

3. A method of preparing a clear, aqueous solution comprising sodium riboflavin 5-phosphate and ferric pyrophosphate soluble which comprises forming an aqueous solution of said riboflavin compound and said iron compound and adjusting the pH of the solution to from about pH 4.2 to about 4.6.

4. The process of claim 3 wherein the pH is adjusted to pH 4.4 with citric acid.

References Cited

UNITED STATES PATENTS

| 2,822,317 | 2/1958 | Gulesich et al. | 424—147 |
| 2,846,352 | 8/1958 | Bryant | 424—252 |
| 3,102,844 | 9/1963 | Ellenbogen | 424—147 |
| 3,160,565 | 12/1964 | Duell | 424—147 |

ALBERT T. MEYERS, Primary Examiner

N. A. DREZIN, Assistant Examiner

U.S. Cl. X.R.

424—200, 252